US011247691B2

(12) United States Patent
Almahmoud et al.

(10) Patent No.: US 11,247,691 B2
(45) Date of Patent: Feb. 15, 2022

(54) TRUCK LOAD MONITORING SYSTEM WITH PERFORMANCE ADAPTATION

(71) Applicant: Toyota Motor Engineering & Manufacturing North America, Inc., Plano, TX (US)

(72) Inventors: Faleh Almahmoud, Belleville, MI (US); Ryan C. Harris, Saline, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 414 days.

(21) Appl. No.: 16/263,494

(22) Filed: Jan. 31, 2019

(65) Prior Publication Data

US 2020/0247423 A1 Aug. 6, 2020

(51) Int. Cl.
| | | |
|---|---|---|
| *B60W 40/13* | (2012.01) | |
| *B60W 30/16* | (2020.01) | |
| *G01G 19/12* | (2006.01) | |
| *B60W 10/20* | (2006.01) | |
| *B60W 10/22* | (2006.01) | |
| *B60W 10/18* | (2012.01) | |

(52) U.S. Cl.
CPC ............ *B60W 40/13* (2013.01); *B60W 10/18* (2013.01); *B60W 10/20* (2013.01); *B60W 10/22* (2013.01); *B60W 30/16* (2013.01); *G01G 19/12* (2013.01)

(58) Field of Classification Search
CPC .. B60W 40/13; B60W 2530/10; B60W 30/16; B60W 10/20; B60W 10/22; B60W 10/18; G01G 19/12
See application file for complete search history.

(56) References Cited

U.S. PATENT DOCUMENTS

| | | | |
|---|---|---|---|
| 5,461,933 A | * | 10/1995 | Ives ..................... G01L 1/2231 164/150.1 |
| 6,157,889 A | | 12/2000 | Baker |
| 6,203,045 B1 | | 3/2001 | Kyrtsos et al. |
| 7,072,763 B2 | | 7/2006 | Saxon et al. |
| 8,103,414 B2 | | 1/2012 | Boss et al. |

(Continued)

FOREIGN PATENT DOCUMENTS

JP       2010-149555       7/2010

*Primary Examiner* — Alan D Hutchinson
*Assistant Examiner* — Andy Schneider
(74) *Attorney, Agent, or Firm* — Oblon, McClelland, Maier & Neustadt, L.L.P.

(57) ABSTRACT

A system for weight monitoring includes a plurality of load sensors that are positioned between a deck floor and a frame mount of a truck, and distributed within a truck bed of the truck to sense a load distribution of a load applied on the truck bed to generate a load distribution data. Each of the load sensors includes a respective through hole load transducer, a respective bolt to fix the through hole load transducer to the truck, and a respective deck cross-member positioned on the load transducer to transfers a mechanical force generated by the load onto the through hole load transducer. The system also includes one or more cameras arranged above the truck bed to monitor a load movement of the load, and a microprocessor configured to receive the load distribution data, determine a vehicle operating parameter accordingly, and transmit the vehicle operating parameter to a vehicle controller.

20 Claims, 7 Drawing Sheets

(56) References Cited

U.S. PATENT DOCUMENTS

| | | | |
|---|---|---|---|
| 2006/0208169 A1* | 9/2006 | Breed | ................ G06K 9/00624 |
| | | | 250/221 |
| 2007/0114756 A1 | 5/2007 | Shagbazyan | |
| 2017/0113607 A1 | 4/2017 | Corrales Salgado et al. | |
| 2018/0170394 A1 | 6/2018 | Bedegi et al. | |
| 2019/0100379 A1* | 4/2019 | Hatayan | ................ G01G 19/52 |

* cited by examiner

TRUCK LOAD MONITORING SYSTEM WITH PERFORMANCE ADAPTATION

BACKGROUND

Vehicle performance is contingent on many variable factors including a load applied on the vehicle. The vehicle performance may vary based on the load, fuel, road condition, weather condition along with many other variables. An operator may not be specifically aware of the limitations placed on vehicle performance due to the load and therefore may operate the vehicle in a manner not recommended for the load.

A mass (or load) distribution of the load over a truck bed of the truck significantly alters the truck's handling, performance, and fuel efficiency. Braking, acceleration, turning, as well as operational safety of the vehicle are all affected by the load distribution. Improper loading on the truck not only reduces vehicle performance but also increases the risk of an accident. A need therefore exists for a system to provide information to optimize the distribution of load. For example, U.S. Pub. No.: US 2007/0114756A1, "SYSTEM & METHOD TO IMPROVE THE FUEL EFFICIENCY AND ENGINE LIFE OF A VEHICLE", discloses a system for automatically adjusting load distribution through axles of a truck and trailer assembly having a pair of rear wheels.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

The present disclosure aims to utilize measurement data from load cells (or transducers) incorporated into a truck bed to provide mass (or load) distribution data to the driver and optimize driving dynamics and comfort.

In a related example, truck bed scales are applied to statically measure the weight of a load. The related examples only measure the overall load on the truck bed. The present disclosure utilizes the data collected from load cells to show how the mass is distributed within the truck bed while also improving overall comfort and driving experience. The mass distribution data may be used to detect unwanted movement of objects in the truck bed. Additionally, the ride quality of the truck may be enhanced by adjusting suspension stiffness according to the mass distribution within the truck bed. The adjustment of suspension stiffness would be particularly effective with air ride suspension. The load can also be used to adjust a following distance of an adaptive cruise control. Moreover, enhancements can be made to steering and brake response for a safer and more controlled driving experience.

In the present disclosure, donut load cells (or through hole transducers) can be positioned between a deck floor and a frame mount at different positions throughout the truck bed. For example, four load cells can be distributed within the truck bed, one at each corner of the truck bed. Such a configuration results in four separate load values that may be combined to give the total weight of the load (or cargo), or interpreted separately to determine the mass in each quadrant of the truck bed. The obtained load information can be displayed on an instrument panel display. If a disproportionate mass is detected in one of the quadrants, a warning can be issued on the instrument panel display.

The system disclosed can further identify undesired cargo movement in the truck bed. If the system detects frequent mass fluctuations, particularly when making turns on relatively flat ground, the driver may be warned to pull over and ensure that the cargo is safely secured. In addition, a Center High-Mounted Stop Lamp (CHMSL) camera may be utilized in this situation to supply the driver with a visual image of the truck bed.

Moreover, mass distribution data may be used to optimize suspension stiffness for handling and comfort. This is especially useful when there is a load bias on either the left or right side of the truck bed. The bias can be detected and the suspension can be adjusted in proportion. Such a system would be particularly effective when paired with an air ride suspension. Braking response and adaptive cruise control's following distance may also be augmented so as to account for the increased overall inertia of the vehicle. Further dynamic adjustments can also be made with regards to steering to provide the driver with more control.

In the present disclosure, the load cell includes a through hole load cell, a button load cell, an in-line load cell for measuring tension and compression, or a pancake load cell for measuring tension and compression.

According to an aspect of the present disclosure, a system for weight monitoring in a truck is provided. The system includes a plurality of load sensors that are positioned between a deck floor and a frame mount of a truck, and distributed within a truck bed of the truck to sense a load distribution of a load applied on the truck bed to generate a load distribution data. Each of the load sensors includes a respective through hole load transducer (or through hole load cell), a respective bolt to fix the through hole load transducer to the truck, and a respective deck cross-member positioned on the load transducer to transfers the load onto the through hole load transducer. The system also includes one or more cameras arranged above the truck bed to monitor a load movement of the load, and a microprocessor configured to receive a load distribution data from the load sensors and the cameras, determine a vehicle operating parameter used to operate the truck based on the load distribution data, and transmit the vehicle operating parameter to a vehicle controller.

In some embodiments, the truck bed is defined into two or more regions, and each of the regions includes one or more load sensors. The load distribution data comprises respective weight information collected from each of the regions in the truck bed.

In some embodiments, a bolt passes through the frame mount, a hole of the through hole load transducer, and a hole of the deck cross-member to fix the through hold load transducer to the truck. In some embodiments, a head of the bolt is positioned below the frame mount of the truck.

In some embodiments, the through hole load transducer further includes a fixed end, an active end configured to sense the load and generate electrical signal that is indicative of a measured weight of the load, a non-loading surface, and a cable line electrically coupled to the microprocessor to transmit the electrical signal to the microprocessor.

In some embodiments, the deck cross-member further includes a first end positioned below the deck floor and connected to the deck floor, and a second end positioned on the active end of the through hole load transducer.

In some embodiments, the disclosed system also includes a display screen that is configured to display a live video captured by the cameras, and display an alarm message transmitted by the microprocessor. The live video is indicative of the load movement of the load. The disclosed system further has an audio device configured to emit an audible alert signal that is transmitted by the microprocessor.

In some embodiments, the vehicle controller optimizes a suspension stiffness of the truck according to the vehicle operation parameter. The vehicle controller also augments a brake response of a brake of the truck or a following distance of an adaptive cruise control of the truck according to the vehicle operation parameter. The vehicle controller further makes a dynamic adjustment of a steering system of the truck according to the vehicle operation parameter.

According to another aspect of the present disclosure, a method for weight monitoring in a truck is provided. In the disclosed method, a load distribution is sensed, and a signal indicative of the load distribution is generated by a plurality of load sensors. The plurality of load sensors are positioned between a deck floor and a frame mount of the truck and distributed within a truck bed of the truck. Each of the plurality of load sensors includes a respective through hole load transducer, a respective bolt to fix the through hole load transducer to the truck, and a respective deck cross-member positioned on the load transducer to pass a mechanical force generated by the load onto the through hole load transducer.

The signal indicative of the load distribution is subsequently transmitted by the load sensors to a microprocessor. The microprocessor determines a vehicle operating parameter used to operate the truck based on the signal indicative of the load distribution, and transmits the vehicle operating parameter to a vehicle controller. The vehicle controller accordingly operates the truck based on the vehicle operating parameter.

In some embodiments, the disclosed method further includes capturing a live video from the truck bed via one or more cameras. The one or more cameras are arranged above the truck bed. The live video is indicative of a load movement of the load applied on the truck bed. The live video is subsequently presented to the driver via a display screen. The display screen is installed in an instrument panel of the truck. Moreover, the microprocessor emits an alarm message to the display screen or an audio device when an overweight value of the load, an abnormal load movement of the load, or an unbalanced load distribution of the load is detected. The alarm message is displayed on the display screen or emitted as an audible alert signal via the audio device.

According to yet another aspect of the present disclosure, a system for weight monitoring in a truck is provided. The system includes a plurality of load cells positioned between a deck floor and a frame mount of a truck. The load cells are distributed within a truck bed of the truck to sense a load distribution of a load on the truck bed and generate a load distribution data. The system also includes one or more cameras arranged above the truck bed to monitor a load movement of the load. The system further includes a microprocessor configured to receive a load distribution data from the plurality of load cells and the one or more cameras, determine a vehicle operating parameter used to operate the truck based on the load distribution data, and transmit the vehicle operating parameter to a vehicle controller. The vehicle controller operating the truck according to the vehicle operating parameter.

In some embodiments, the load cell includes a through hole load cell, a button load cell, an in-line load cell for measuring tension and compression, and a pancake load cell for measuring tension and compression.

By utilizing data from load sensors incorporated into the truck bed, the present disclosure can provide the mass (or load) distribution data of the load to the driver and optimize driving dynamics and comfort according to the mass distribution data of the load. The disclosed system further includes the camera that captures the live video from the truck bed so that provides the driver in situ load movement information of the load. An alarm message can be issued when an overweight load, an abnormal load movement, or an unbalanced load distribution is detected. Thereby, comparing to related examples, the disclosed system provides improvements both in driving safety and driving comfort.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
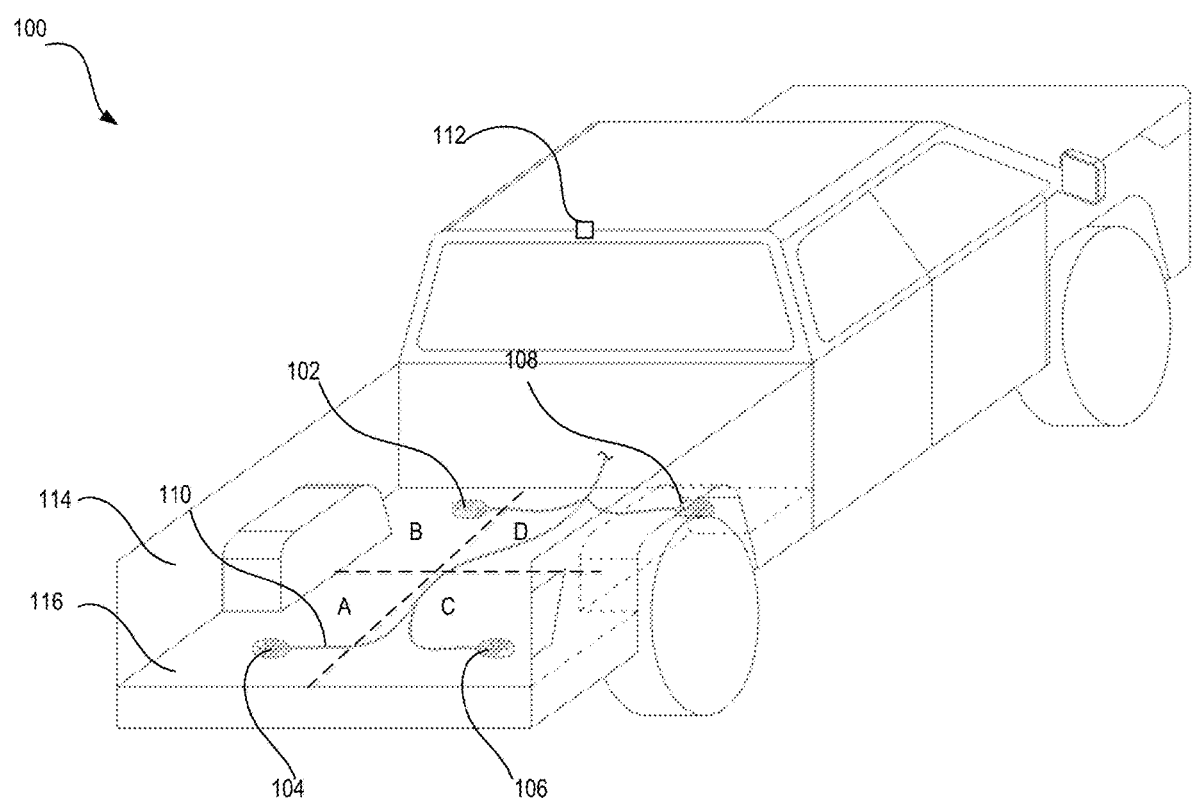
FIG. 1 is an illustration of an exemplary system for weight monitoring in a truck, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

Driving safety is important to a driver or a passenger of a vehicle. In the current disclosure, a system and a method are disclosed to provide an in situ load distribution monitoring in a truck, and optimize driving dynamics and comfort according to the load distribution data of the load.

FIG. 1 is an exemplary system 100 for weight monitoring in a truck. As shown in FIG. 1, the system 100 can include a plurality of load sensors distributed in a truck bed 114 in a truck to sense a load distribution of a load on the truck bed and generate a load distribution data. For example, four load sensors 102, 104, 106 and 108 are included in the system 100, as shown in FIG. 1. The truck bed can be formed by a deck floor 116 and surrounding frames and is configured to receive the load. The load sensors 102-108 can be arranged between the deck floor 116 and a frame mount (i.e., 118 in FIG. 2) of the truck. The deck floor 116 can be defined into two or more regions. The defined regions can be equal or unequal according to technology design. Each of the regions includes one or more load sensors. For example, four equal regions (quadrants) A-D are defined in the deck floor 116 as shown in FIG. 1, and each quadrant can have a respective load sensor. For example, a quadrant A has a load sensor 104, and a quadrant C has a load sensor 106.

Configuration as shown in FIG. 1 results in four separate load values that can be combined to give the total weight of the load, or interpreted separately to determine a mass (or weight) in each quadrant of the truck bed to generate a load (or mass, or weight) distribution data. The total weight data or the load distribution data can be displayed on a display screen (not shown) that is installed in an instrument panel of the truck. If a disproportionate mass is detected in one of the quadrants, a warning can be issued on the display screen.

Still referring to FIG. 1, the load sensors 102-108 are connected by a cable 110, and the cable 110 is further electrically coupled to a microprocessor (not shown) to transmit the load distribution data sensed by the load sensors. The microprocessor receives and analyzes the load distribution data transmitted from the load sensors to determine a vehicle operating parameter that is used to operate the truck. The vehicle operation parameter subsequently is sent to a vehicle controller (not shown). The vehicle controller can further adjust a vehicle cooling, transmission, braking, suspension, cruise control, steering, accelerating, or engine system into a revised operating mode according to the load distribution data.

The microprocessor can also give an alarm message through the display screen or an audio device (not shown) when an overweight value of the load, an abnormal load movement of the load, or an unbalanced load distribution of the load is detected based on the load distribution data transmitted by the load sensors.

The system 100 also includes one or more cameras. The cameras are arranged above the truck bed to generate a live video of the truck bed so as to monitor a load movement of the load. For example, a camera 112 is positioned above the truck bed 114, and mounted on a back wall of a truck head and adjacent to a celling of the truck head. The camera 112 can be a Center High-Mounted Stop Lamp (CHMSL) camera. The CHMSL camera gives visibility into what's in the truck bed or where trailer gooseneck is. The live video captured by the camera is presented to the driver via the display screen.

Figure 2:
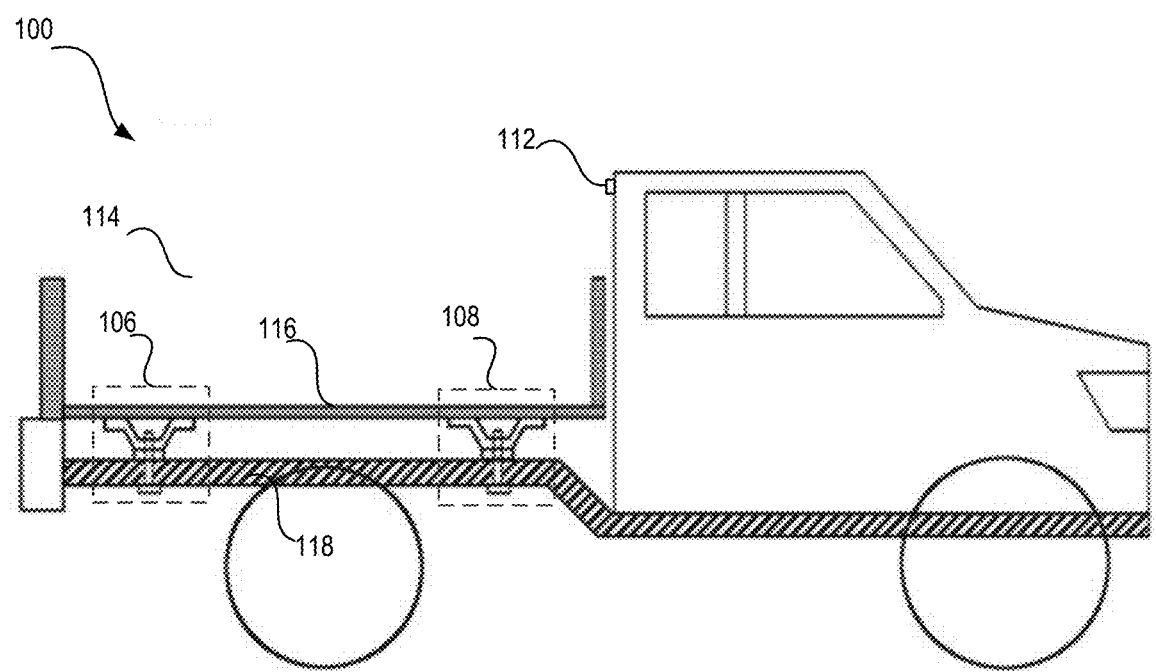
FIG. 2 is an illustration of a section view of the exemplary system for weight monitoring in the truck, in accordance with some embodiments.

FIG. 2 is an illustration of a section view of the exemplary system 100 for weight monitoring in the truck. As shown in FIG. 2, the load sensors 106 and 108 are positioned between the deck floor 116 and the frame mount 118 of the truck. The deck floor 116 is defined into four equal regions (quadrants) and each of the four equal regions includes one load sensor. It should be noted that the load sensor should be located as close as possible to a center of a respective quadrant (region) where the load sensor is located on the truck bed. Such a configuration can ensure an accurate measurement. In addition, FIG. 2 is merely an example, and the deck floor 116 can be defined into more than four regions, and each of the defined regions can include more than one load sensors based on technology requirements.

Figure 3:
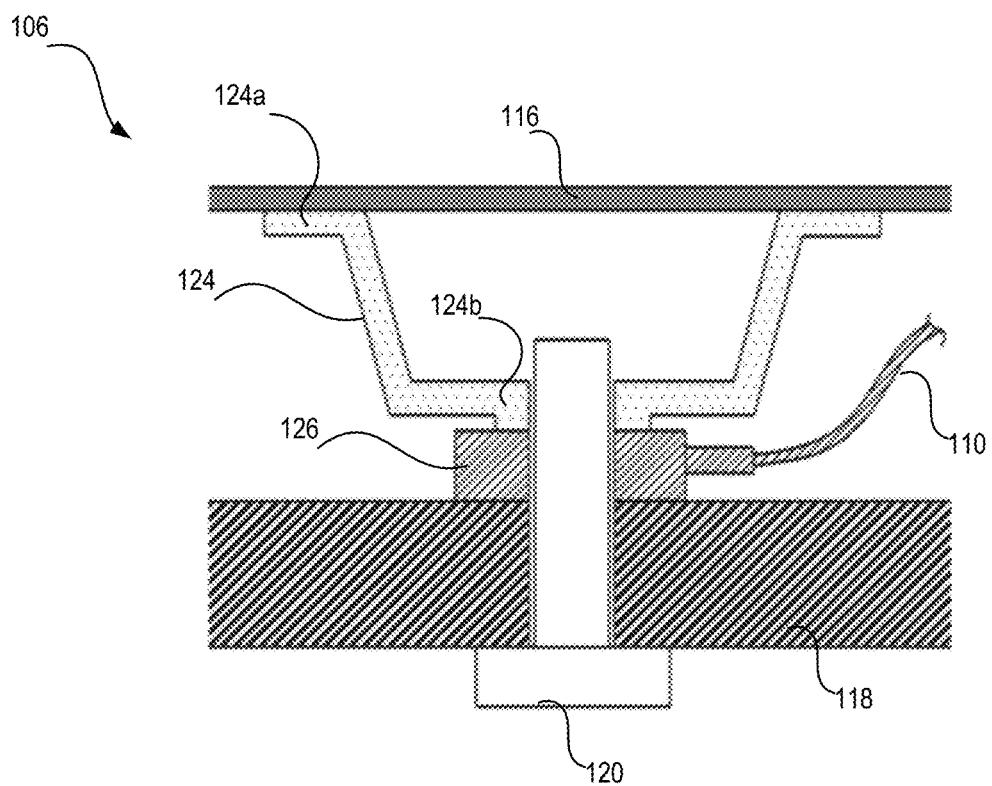
FIG. 3 is an illustration of an enlarged view of a load sensor, in accordance with some embodiments.

FIG. 3 is an illustration of an enlarged view of the load sensor 106. As shown in FIG. 3, the sensor 106 includes a through hole load transducer (or cell) 126, a bolt 120 to fix the through hole load transducer 126 to the truck, and a deck cross-member 124 positioned on the load transducer 126 to transfers a mechanical force generated by the load onto the through hole load transducer for measurement. The load transducer 126 subsequently converts the sensed mechanical force into a measurable electrical signal. The measurable electrical signal is indicative of a weight value of the load.

Still referring to FIG. 3, the bolt 120 is passed through a first hole in the frame mount 118, and a second hole in the deck cross-member 124. The second hole in the deck cross-member 124 is typically threaded, which allows the truck bed 114/deck floor 116 to be securely attached to the frame mount 118. The bolt 120 also passes through a third hole in the load transducer (or cell) 126 which is sandwiched between the deck cross-member 124 and the frame mount 118. The deck cross-member 124 further include a first end 124a that is positioned below the deck floor 116 and connected to the deck floor 116, and a second end 124b that is positioned on an active end (402, FIG. 4) of the through hole load transducer 126. As the load is applied to the deck floor 116, the deck cross-member 124 transfers the mechanical force generated by the load onto the load transducer 126 for measurement. The load transducer 126 generates the measurable electrical signal and transmits the measurable electrical signal through the cable 110 to the microprocessor for analysis. The microprocessor can generate a total weight value of the load, a load distribution of the load, or detect a load movement of the load based on the measurable electrical signal transmitted from the load transducer, such as load transducer 126. It should be noted that the load sensor 106 may also include various washers, nuts, and other miscellaneous components.

Figure 4:
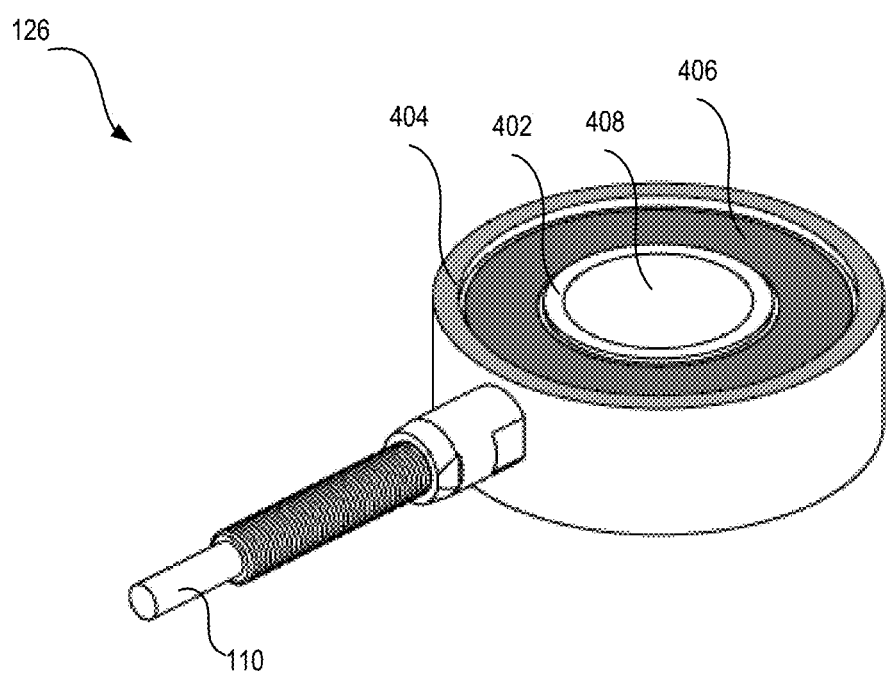
FIG. 4 is an illustration of an exemplary load transducer (or load cell) of the load sensor, in accordance with some embodiments.

FIG. 4 is an illustration of an exemplary load transducer 126 of the load sensor 106. The load transducer 126 has a through hold (or donut) configuration with a hole 408 passing through a center of the load transducer 126. The load transducer 126 can have a circular shape with a fixed end 404, an active end 402, a non-loading surface 406, and a cable line 110 electrically coupled to the microprocessor to transmit the electrical signal to the microprocessor. The active end 402 is in direct contact with the second end 124b of the deck cross-member 124, and configured to sense the load and generate an electrical signal that is indicative of a measured weight of the load.

In some embodiments, the fixed end 404 can have an outer diameter between 40 mm and 30 mm, and an inner diameter between 30 mm and 20 mm. The active end 402 can have an outer diameter of between 30 mm and 20 mm, and an inner diameter between 20 mm and 10 mm. The load transducer 126 can a capability to weight a load from 100 lb to 5000 lb, and be operated at a temperature range from −50° C. to 93° C. However, it should be noted that the above parameters are merely examples, and the load transducer 126 can have other suitable dimensions, other capabilities to weight the load, and other operation temperatures.

Still referring to FIG. 4, in some embodiments, the load transducer 126 can include a circuit consisting of four bridge sensors (not shown) with a respective resistance, such as 700 Ohm, to sense the weight of the load. The circuit can have a maximum input (or excitation) voltage, such as 18 V, and an output voltage (i.e., the electrical signal) that can be within 1.5 mV/V when the load is equal or less than 100 lb, and can be within 2 m V/V when the load is between 250 lb and 5000 lb. When the mechanical force of the load is passing to the active load 402 via the deck cross-member 124, the active end 402 can be pushed down to a difference level according to a value of the mechanical force, and the load transducer 126 accordingly generates a different output voltage value. The value of the output voltage is indicative of the weight of the load. It should be noted that the above parameters related to the circuit are merely examples, and the bridge sensors 126 can have other suitable resistances according to the design, and the input voltage and the output voltage of the circuit can be other suitable values depending on the technology requirement.

Figure 5:
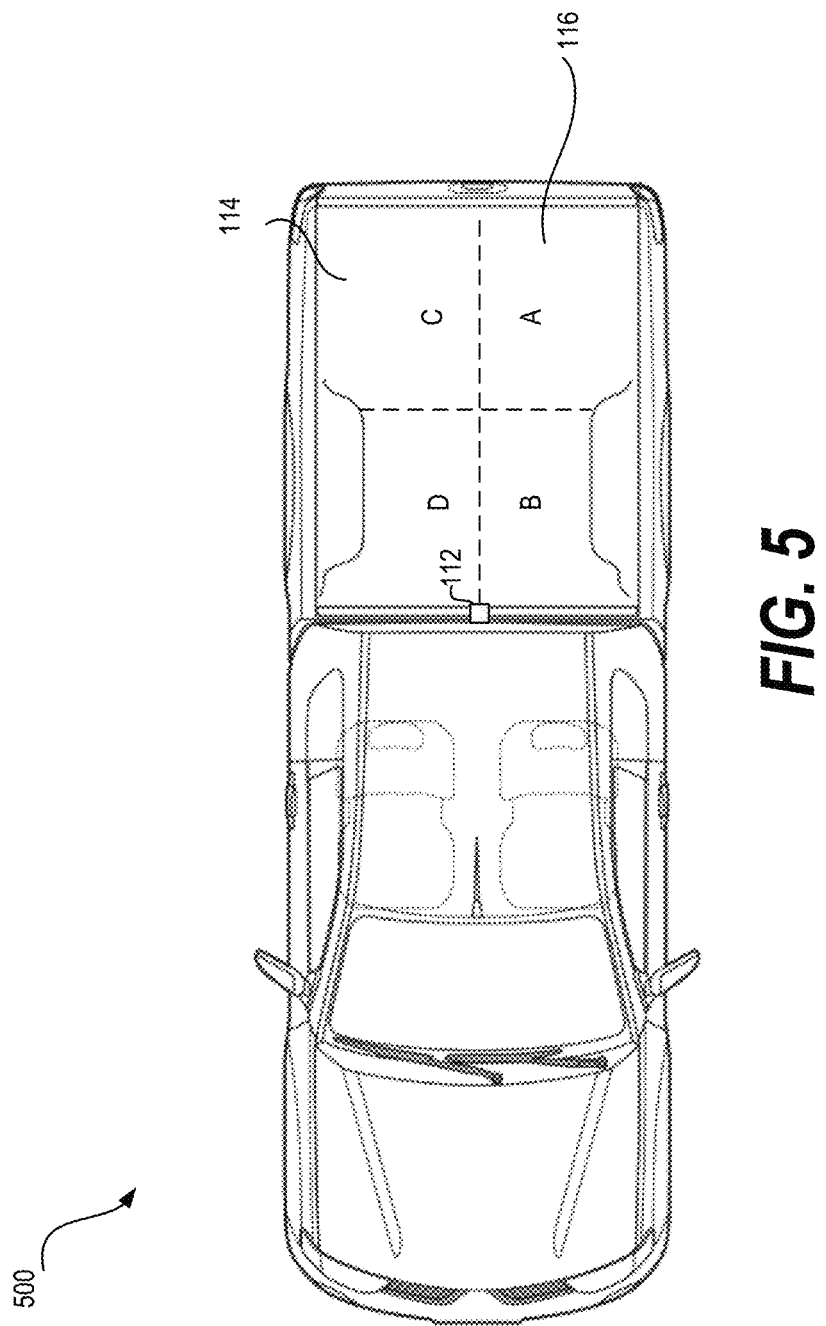
FIG. 5 is an illustration of an exemplary load distribution of a load, in accordance with some embodiments.

FIG. 5 is an illustration of an exemplary load distribution 500 of the load. As shown in FIG. 5, the truck bed 114 can include the deck floor 116. The deck floor 116 can be defined into four equal regions A-D. The load can be applied on the four regions A-D, thus each of the four regions A-D can have a respective sub-load (or sub-weight). For example, the region A can have a sub-load of 20 Kg, the region B can have a sub-load of 50 Kg, the region C can have a sub-load of 30 Kg, and the region D can have a sub-load of 200 Kg.

Referring to FIG. 1, four load sensors 102-108 can be distributed within the deck floor 116. For example, the region A can have a load sensor of 104, the region B can have a load sensor 102, the region C can have a load sensor 106, and the region D can have a load sensor 108. As mentioned above, each of the four load sensors can generate a respective load (or weight) value and the load values can be transmitted to the microprocessor. The microprocessor accordingly can give a total weight of the load based on the transmitted load values, or interpret the load values separately to determine the mass in each quadrant of the truck bed to generate a load distribution data. The microprocessor can further identify undesired load movement in the truck bed based on the transmitted load values. If the microprocessor detects frequent mass fluctuations, particularly when making turns on relatively flat ground, the driver may be warned to pull over and ensure that the load is safely secured. The CHMSL camera 112 may also be utilized in such a situation to supply the driver with a visual image of the truck bed.

Still referring to FIG. 5, the microprocessor can identify an unbalanced load distribution. For example, a disproportionate mass is detected in one of the quadrants, such as region D that a much heavier sub-load of 200 Kg than other three regions. The microprocessor can, via the vehicle controller, adjust the vehicle cooling, transmission, braking, suspension, cruise control, steering, accelerating, or engine system into a revised operating mode according to the load distribution data for driving safety. The microprocessor can further send an alarm message through the audio device or the display screen to the driver to inform the unbalanced load distribution.

Figure 6:
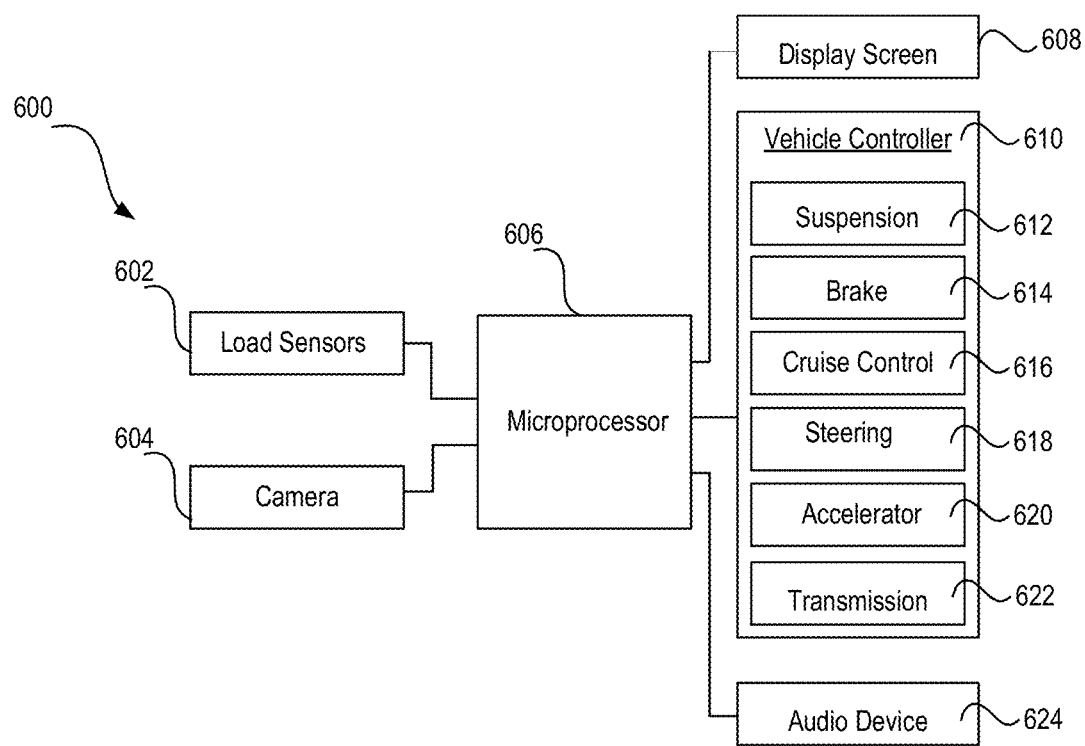
FIG. 6 is a block diagram schematically showing a circuitry of the system for weight monitoring in a truck, in accordance with some embodiments.

FIG. 6 is a block diagram schematically showing a circuitry 600 of the system 100 for weight monitoring in the truck. The circuitry 600 can include the load sensors 602, the camera 604, the microprocessor 606, the display screen 608, the vehicle controller 610, and the audio device 624. The vehicle controller 610 can adjust the vehicle suspension 612, brake 614, cruise control 616, steering 618, accelerator 620, and transmission 622. The vehicle controller can also adjust the vehicle cooling, or engine system.

The microprocessor 606 can be a well-known microcomputer or a processor having CPU (central processing unit), ROM (read only memory), RAM (random access memory) and I/O (input and output) interface. The microprocessor 606 is configured to receive load values from the plurality of load sensors 602 and the live video from the camera 604, determine a vehicle operating parameter used to operate the truck based on the load distribution data and the live video, and transmit the vehicle operating parameter to the vehicle controller 610.

As mentioned above, the microprocessor can give a total weight of the load based on the load values, or interpret the load values separately to determine the mass in each region of the truck bed to generate a load distribution data. The microprocessor can further identify undesired load movement in the truck bed based on the transmitted load values. Based on the load distribution data, the microprocessor can identify an operation parameter, and transmit the operation parameter to the vehicle controller 610. The vehicle controller 610 can adjust the vehicle cooling, transmission, braking, suspension, cruise control, steering, accelerating, or engine system into a revised operating mode according to the load distribution data. For example, the vehicle controller 610 can optimize the suspension stiffness of the truck for handling and comfort. The braking response of the brake 614 and the following distance of the adaptive cruise control 616 may also be augmented so as to account for the increased overall inertia of the vehicle. Further dynamic adjustments can also be made with regards to steering 618 to provide the driver with more control.

The microprocessor 606 can further provide an alarm message to the driver through the display screen 608 or the audio device 624 when the microprocessor detects an overweight value of the load, an abnormal load movement of the load, or an unbalanced load distribution of the load.

As mentioned above, the camera 604 can be a visible light camera, an infrared camera, or a CHMSL camera. The camera 604 can be configured to capture visual data from the truck bed to generate a live video. The live video can be transmitted to the display screen 608 for the driver to monitor the load movement. The camera 604 can be arranged above the truck bed 114, and mounted on the back wall of the truck head and adjacent to the celling of the truck head. The camera 604 can also be positioned to other suitable locations, such as at a back door of the truck, to monitor the load movement.

The load sensor 602 can include a through hole load cell (or transducer), a button load cell, an in-line load cell for measuring tension and compression, a pancake load cell for measuring tension and compression, or other suitable load cells.

The display screen 608 is configured to display the live video recorded by the camera 604. The display screen 608 can be electrically coupled to the camera 604 and the microprocessor 606. When the camera 604 is activated, the camera 604 captures visual data from the truck bed of the truck. The visual data is sent to the microprocessor 606 for signal processing. The processed visual data is further transmitted by the microprocessor 606 to the display screen 608 for display. The display screen can also display an alarm message transmitted by the microprocessor 606 when the microprocessor 606 identifies the overweight value of the load, the abnormal load movement of the load, or the unbalanced load distribution of the load based on the load values from the load sensors 602. The display screen 608 can be a cathode ray tube display (CRT), a light-emitting diode display (LED), an electroluminescent display (ELD), a liquid crystal display (LCD), an organic light-emitting diode display (OLED), or the like.

The audio device 624 can be an audio output device, and is configured to turn an electrical signal into an audio signal. In an embodiment of FIG. 6, the audio device 624 can include a speaker. When the microprocessor 606 identifies the overweight value of the load, the abnormal load movement of the load, or the unbalanced load distribution of the load based on the load values from the load sensors 602, the microprocessor 606 can send an alarm signal to the audio device 624. The audio device 624 subsequently transforms the alarm signal into an audio message to the driver.

The vehicle controller 610 can be electro-mechanical equipment to guide the vehicle cooling, transmission, braking, suspension, cruise control, steering, accelerating, or engine system into a revised operating mode. As mentioned above, based on the load distribution data, the microprocessor 606 can identify an operation parameter, and transmit the operation parameter to the vehicle controller 610. The vehicle controller 610 can adjust the vehicle cooling, transmission, braking, suspension, cruise control, steering, accelerating, or engine system into a revised operating mode according to the load distribution data.

Figure 7:
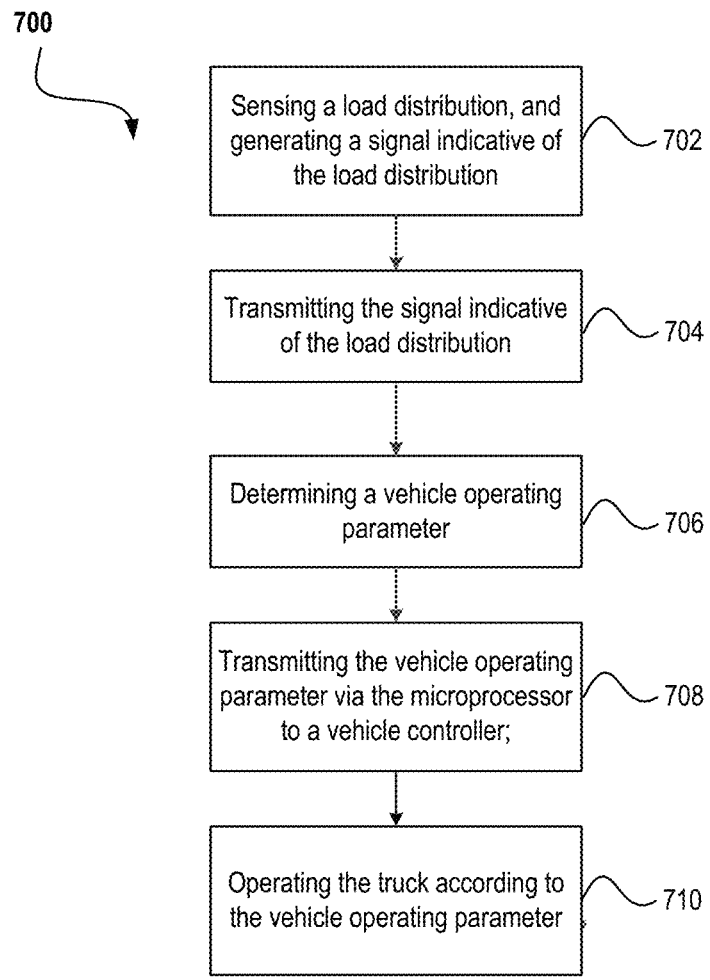
FIG. 7 is a flowchart outlining an exemplary operation of the system for weight monitoring in a truck, in accordance with some embodiments.

FIG. 7 is a flowchart 700 outlining an exemplary operation of the system 100 for weight monitoring. The flowchart 700 starts with step 702 where load sensors sense a load distribution of a load applied on a truck bed, and generate signals indicative of the load distribution. The load sensors can be positioned between a deck floor and a frame mount of the truck, and distributed within the truck bed of the truck. At step 702, one or more cameras can also capture a live video of the truck bed to monitor a load movement of the load.

At step 704, the signals generated by the load sensors can be transmitted to a microprocessor. The microprocessor can process the signals into load/weight information. For example, the microprocessor can give a total weight of the load based on the transmitted signals, or interpret the signals separately to determine the mass in each region of the truck bed to generate a load distribution data.

At step 706, the microprocessor can determine a vehicle operating parameter based on the load distribution data. For example, the operation parameter can be an instruction to optimize a suspension stiffness of the truck according to the load distribution data, an instruction to augment a brake response of a brake of the truck or a following distance of an adaptive cruise control of the truck, or an instruction to make a dynamic adjustment of a steering system of the truck according to the load distribution data.

The flowchart 700 then proceeds to step 708 where the operation parameter can be transmitted to a vehicle controller by the microprocessor. At step 708, the microprocessor can also send an warning message to a display screen or an audio device when the microprocessor identify an overweight value of the load, an abnormal load movement of the load, and an unbalanced load distribution of the load.

At step 710, the vehicle controller subsequently adjusts the vehicle according to the operation parameter. The vehicle controller can be electro-mechanical equipment to guide the vehicle cooling, transmission, braking, suspension, cruise control, steering, accelerating, or engine system into a revised operating mode. At step 710, the warning message transmitted from the microprocessor can further be displayed via the display screen as a text message or a video message, or displayed via the audio device as an audio alarm.

In the present disclosure, a novel method and a system for weight monitoring in a truck are provided. By incorporating a plurality of load sensors and one or more cameras into the truck, the present disclosure improves driving safety and driving comfort. Comparing to related examples, the disclosed system provides a mass (or load) distribution data of a load that is sensed by the load sensors to the driver and optimize driving dynamics and comfort according to the mass distribution data of the load. The disclosed system further provides a live video of the load that is captured by the cameras to the driver so that in situ load movement information of the load is provided. An alarm message can also be provided when an overweight value of the load, an abnormal load movement of the load, or an unbalanced load distribution of the load is detected. Thereby, comparing to related examples, the disclosed system provides improvements both in driving safety and driving comfort.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. A system for weight monitoring in a truck, comprising:
a vehicle controller configured to operate the truck;
a plurality of load sensors positioned between a deck floor and a frame mount of a truck, and distributed within a truck bed of the truck to sense a load distribution of a load applied on the truck bed and generate a load distribution data of the load and a total weight value of the load, each of the plurality of load sensors including a respective through hole load transducer, a respective bolt to fix the respective through hole load transducer to the truck, and a respective deck cross-member positioned on the respective through hole load transducer to pass a mechanical force generated by the load onto the respective through hole load transducer for measurement, wherein the deck floor is defined into two or more regions that are distinct, and each of the two or more regions includes one or more of the load sensors positioned in a center of the region;
one or more cameras arranged above the truck bed to capture a live video of the truck bed, the live video being indicative of a load movement of the load; and
a microprocessor configured to receive the load distribution data from the plurality of load sensors and the live video from the one or more cameras, determine a vehicle operating parameter used to operate the truck based on the load distribution data and the live video, and transmit the vehicle operating parameter to the vehicle controller.

2. The system of claim 1, wherein the vehicle controller is configured to adjust an operating mode of a transmission, a suspension, or a cruise control of the truck according to the vehicle operating parameter that is determined based on the load distribution data and the live video.

3. The system of claim 1, wherein the load distribution data comprises respective weight information collected from each of the two or more regions in the truck bed.

4. The system of claim 1, wherein the respective bolt passes through a first hole of the frame mount, a second hole of the respective through hole load transducer, and a third hole of the respective deck cross-member to fix the respective through hole load transducer to the truck.

5. The system of claim 1, wherein a head of the respective bolt is positioned below the frame mount of the truck.

6. The system of claim 1, wherein the respective through hole load transducer comprises:
a fixed end;
an active end configured to sense the load and generate an electrical signal, the electrical signal being indicative of a measured weight of the load;
a non-loading surface; and
a cable line electrically coupled to the microprocessor to transmit the electrical signal to the microprocessor.

7. The system of claim 6, wherein the respective deck cross-member further comprises a first end positioned below the deck floor and connected to the deck floor, and a second end positioned on the active end of the respective through hole load transducer.

8. The system of claim 1, further comprising:
a display screen configured to display the live video captured by the one or more cameras, and display an alarm message transmitted by the microprocessor when the microprocessor detects at least one of an overweight value of the load, an abnormal load movement of the load, and an unbalanced load distribution of the load, the live video being indicative of the load movement of the load; and
an audio device configured to emit an audible alert signal that is transmitted by the microprocessor when the microprocessor detects the at least one of the overweight value of the load, the abnormal load movement of the load, and the unbalanced load distribution of the load.

9. The system of claim 1, wherein the vehicle controller is configured to optimize a suspension stiffness of the truck according to the vehicle operation parameter.

10. The system of claim 1, wherein the vehicle controller is configured to augment a brake response of a brake of the truck or a following distance of an adaptive cruise control of the truck according to the vehicle operation parameter.

11. The system of claim 1, wherein the vehicle controller is configured to make a dynamic adjustment of a steering system of the truck according to the vehicle operation parameter.

12. A method for weight monitoring in a truck, comprising:
sensing a load distribution and generating a signal indicative of the load distribution using a plurality of load sensors positioned between a deck floor and a frame mount of the truck and distributed within a truck bed of the truck, each of the plurality of load sensors including a respective through hole load transducer, a respective bolt to fix the respective through hole load transducer to the truck, and a respective deck cross-member positioned on the respective load transducer to pass a mechanical force generated by the load onto the respective through hole load transducer, wherein the deck floor is defined into two or more regions that are distinct, and using the plurality of load sensors includes using one or more of load sensors positioned in a center of each of the two or more regions;
transmitting the signal indicative of the load distribution to a microprocessor;
determining, by the microprocessor, a vehicle operating parameter used to operate the truck based on the signal indicative of the load distribution;
transmitting the vehicle operating parameter via the microprocessor to a vehicle controller; and
operating the truck according to the vehicle operating parameter via the vehicle controller.

13. The method of claim 12, further comprising:
capturing a live video from the truck bed via one or more cameras, the one or more cameras being arranged above the truck bed, the live video being indicative of a load movement of the load;
displaying the live video via a display screen, the display screen being installed in an instrumental panel of the truck; and
emitting an alarm message by the microprocessor to a display screen or an audio device when an abnormal load movement is detected, the alarm message being displayed on the display screen or emitted as an audible alert signal via the an audio device.

14. The method of claim 12, wherein operating the truck according to the vehicle operating parameter via the vehicle controller comprises at least one of optimizing a suspension stiffness of the truck, augmenting a brake response of a brake of the truck, adjusting a following distance of an adaptive cruise control of the truck, and making a dynamic adjustment of a steering system of the truck.

15. The method of claim 12, wherein using the plurality of load sensors includes using load sensors in which the respective bolt passes through a first hole of the frame mount, a second hole of the respective through hole load transducer, and a third hole of the respective deck cross-member to fix the through hole load transducer to the truck.

16. The method of claim 12, wherein using the plurality of load sensors includes using load sensors in which the respective through hole load transducer comprises:
a fixed end;
an active end configured to sense the load and generate an electrical signal, the electrical signal being indicative of a measured weight of the load;
a non-loading surface; and
a cable line electrically coupled to the microprocessor to transmit the electrical signal to the microprocessor.

17. The method of claim 16, wherein using the plurality of load sensors includes using load sensors in which the respective deck cross-member further comprises a first end positioned below the deck floor and connected to the deck floor, and a second end positioned on the active load of the active end of the respective through hole load transducer.

18. A system for weight monitoring in a truck, comprising
a vehicle controller configured to operate the truck;
a plurality of load cells positioned between a deck floor and a frame mount of a truck, and distributed within a truck bed of the truck to sense a load distribution of a load on the truck bed and generate a load distribution data, wherein the deck floor is defined into two or more regions that are distinct, and each of the two or more regions includes one or more of the load cells positioned in a center of the region;
one or more cameras arranged above the truck bed to capture a live video of the truck bed, the live video being indicative of a load movement of the load; and
a microprocessor configured to receive the load distribution data from the plurality of load cells and the live video from the one or more cameras, determine a vehicle operating parameter used to operate the truck based on the load distribution data and the live video, and transmit the vehicle operating parameter to a vehicle controller, the vehicle controller operating the truck according to the vehicle operating parameter.

19. The system of claim 18, wherein the vehicle controller is configured to at least one of optimize a suspension stiffness of the truck, augment a brake response of a brake of the truck, adjust a following distance of an adaptive cruise control of the truck, and make a dynamic adjustment of a steering system of the truck according to the vehicle operating parameter.

20. The system of claim 18, wherein each of the load cells comprises at least of one of a through hole load cell, a button load cell, an in-line load cell for measuring tension and compression, and a pancake load cell for measuring tension and compression.

* * * * *